United States Patent
Gao et al.

(10) Patent No.: US 12,510,540 B2
(45) Date of Patent: Dec. 30, 2025

(54) **ANTIGEN AND KIT FOR DETECTION OF *HELICOBACTER PYLORI* ANTIBODY, AND PREPARATION METHOD THEREOF**

(71) Applicant: SHANGHAI OUTDO BIOTECH CO., LTD., Shanghai (CN)

(72) Inventors: Hengjun Gao, Shanghai (CN); Jie Jin, Shanghai (CN); Xiaoyan Zhang, Shanghai (CN); Liangda Song, Shanghai (CN); Jing Li, Shanghai (CN)

(73) Assignee: SHANGHAI OUTDO BIOTECH CO., LTD., Shanghai (CN)

( * ) Notice: Subject to any disclaimer, the term of this patent is extended or adjusted under 35 U.S.C. 154(b) by 0 days.

(21) Appl. No.: 18/848,521

(22) PCT Filed: Dec. 6, 2022

(86) PCT No.: PCT/CN2022/136954
§ 371 (c)(1),
(2) Date: Sep. 19, 2024

(87) PCT Pub. No.: WO2024/066037
PCT Pub. Date: Apr. 4, 2024

(65) Prior Publication Data
US 2025/0110124 A1 Apr. 3, 2025

(30) Foreign Application Priority Data
Sep. 27, 2022 (CN) .......................... 202211177904.2

(51) Int. Cl.
*G01N 33/569* (2006.01)
*G01N 21/84* (2006.01)
(Continued)

(52) U.S. Cl.
CPC ... *G01N 33/56911* (2013.01); *G01N 21/8483* (2013.01); *G01N 33/532* (2013.01);
(Continued)

(58) Field of Classification Search
CPC ......... G01N 33/56911; G01N 21/8483; G01N 33/532; G01N 33/54387; G01N 2333/195; G01N 2469/20
See application file for complete search history.

(56) References Cited

U.S. PATENT DOCUMENTS

2018/0306828 A1* 10/2018 Wei ...................... G01N 33/943

FOREIGN PATENT DOCUMENTS

| CN | 101495865 A | 7/2009 |
| CN | 107192821 A | 9/2017 |
| CN | 115267208 A | 11/2022 |

OTHER PUBLICATIONS

Cui Zhao, Expression and immunogenicity of *Helicobacter pylori* hpaA-cagA fusiongene in Lactococcus lactis, Jilin Agricultural University, 2019, pp. 1-46.

* cited by examiner

*Primary Examiner* — Bao-Thuy L Nguyen
(74) *Attorney, Agent, or Firm* — Bayramoglu Law Offices LLC

(57) ABSTRACT

A kit for the detection of *Helicobacter pylori* antibody in an oral exudate is provided. The kit includes an antigen and a diluent for diluting the oral exudate. The antigen is *Helicobacter pylori* HpC-025 with the deposit registration number of CCTCC No: M20221024. The diluent contains phosphate buffered saline (PBS), casein, surfactant Tetronic 1307, and surfactant RHODASURF® ON-870. The kit may also include, a sampling swab, a collection tube, a plate cartridge, and a test strip with a binding pad bound with latex microspheres labeled with the *Helicobacter pylori* HpC-025 antigen.

8 Claims, 3 Drawing Sheets

(51) Int. Cl.
*G01N 33/532* (2006.01)
*G01N 33/543* (2006.01)
(52) U.S. Cl.
CPC . *G01N 33/54387* (2021.08); *G01N 2333/195* (2013.01); *G01N 2469/20* (2013.01)

ANTIGEN AND KIT FOR DETECTION OF *HELICOBACTER PYLORI* ANTIBODY, AND PREPARATION METHOD THEREOF

CROSS REFERENCE TO THE RELATED APPLICATIONS

This application is the national phase entry of International Application No. PCT/CN2022/136954, filed on Dec. 6, 2022, which is based upon and claims priority to Chinese Patent Application No. 202211177904.2, filed on Sep. 27, 2022, the entire contents of which are incorporated herein by reference.

TECHNICAL FIELD

The present invention relates to the field of medical testing, specifically to an antigen and kit for the detection of a *Helicobacter pylori* antibody, and preparation methods thereof.

BACKGROUND

The diagnostic methods of *Helicobacter pylori* (Hp) infection are divided into two categories: invasive and non-invasive. The invasive examination is performed based on endoscopy and gastric mucosal biopsy. Gastric mucosal tissues are taken under a gastroscope for examination. The examination methods include rapid urease test, direct smear, histological examination, bacterial culture and molecular biological detection (*Helicobacter pylori* typing and gene mutation detection); non-invasive detection methods of *Helicobacter pylori* include urea breath test, fecal *Helicobacter pylori* antigen detection and *Helicobacter pylori* serological antibody test.

Hp infection is the cause of chronic active gastritis, peptic ulcer and gastric mucosa-associated lymphoid tissue lymphoma, and is the main pathogenic factor of gastric cancer. Therefore, Hp is the most important risk factor for gastric cancer so far, and adenocarcinoma is the most common type, accounting for about 90%. Hp was classified as a class I carcinogen in 1994 by the World Health Organization/International Agency for Research on Cancer (WHO/IARC). In China, the infection rate of *Helicobacter pylori* is about 60%.

The detection of *Helicobacter pylori* antibody in serum (or plasma) is common in the market, but due to the specificity of test samples, such detection means must be completed in a hospital and is not applicable to universal screening. For younger children, blood collection can be resistant, making sampling more difficult and more inappropriate for universal screening for Hp infection in children.

Data from studies have shown that antibodies to *Helicobacter pylori* are also present in oral exudate or urine samples with a high degree of consistency compared to serum tests. However, as urine is a metabolite, it is greatly affected by the individual's physical condition, water intake, etc., and the test results are prone to fluctuations. The main components of oral exudate are mixed from saliva and gingival crevicular fluid, and the gingival crevicular fluid produced by blood permeation in the gingival margin and buccal mucosa capillaries contains antibodies and other blood components consistent with those in blood, so it is relatively more stable to use it as a sample for immunoassay. The difficulty in detecting antibodies to *Helicobacter pylori* in oral exudate is that it contains low levels of antibody, about 5%-10% of the serum level. Therefore, a very high reaction sensitivity is proposed for the detection reagent. Currently, most of the tests for *Helicobacter pylori* antibodies are considered to be used for blood samples, while products used for urine testing often need to be equipped with other simple instruments for readings, or the operation steps are more complicated and require professional operation. However, the products used for oral exudate detection are still blank.

Hp strains are different in different regions and different populations. The sequences used in the preparation of the commonly used commercially available Hp recombinant antigens are from standard libraries, but their sequences have certain limitations, and their ability to detect different types of Hp strains varies greatly.

SUMMARY

In order to obtain antigens with good detectability for antibodies produced by different types of Hp strains, one aspect of the present invention provides an antigen for the detection of the *Helicobacter pylori* antibody, *Helicobacter pylori* HpC-025, with the deposit registration number of CCTCC No: M20221024, deposited on Jul. 4, 2022, deposited at China Center for Type Culture Collection in Wuhan University.

Further, the antigen used for *Helicobacter pylori* antibody detection is an Hp natural antigen, named HPC-025 natural antigen, obtained from an anaerobic culture of *Helicobacter pylori* HPC-025, enriched by centrifugal washing with phosphate buffered saline (PBS), and resuspended with PBS.

Further, both pH of PBS for washing and resuspending are 7.0.

In another aspect, the present invention provides a *Helicobacter pylori* antibody detection kit comprising an antigen for the detection of the *Helicobacter pylori* antibody as described above.

Further, the detection object of the *Helicobacter pylori* antibody detection kit is oral exudate; the kit further comprises a diluent for diluting the oral exudate; the diluent contains PBS, casein, the surfactant Tetronic 1307 (S9) (ethylenediamine tetrakis(ethoxylate-block-propoxylate) tetrol) and the surfactant RHODASURF® ON-870 (S17) (ethoxylated oleyl alcohol).

In some embodiments, the diluent is a mixture of 20-100 mM pH 7.0 PBS added with 0.1-0.5% casein, 0.1-0.5% surfactant Tetronic 1307 (S9), and 0.1-0.5% surfactant RHODASURF® ON-870 (S17).

In some embodiments, the diluent is a mixture of 50 mM pH 7.0 PBS added with 0.2% casein, 0.2% surfactant Tetronic 1307 (S9), and 0.2% surfactant RHODASURF® ON-870 (S17).

In some embodiments, the *Helicobacter pylori* antibody detection kit further comprises a test strip; wherein the test strip comprises a binding pad; the binding pad binds a latex microsphere-labeled antigen for the detection of the *Helicobacter pylori* antibody as described above. Since the *Helicobacter pylori* antibody detection antigen is a natural antigen, the latex microsphere labeled *Helicobacter pylori* antibody detection antigen as described above is also referred to as latex microsphere labeled *Helicobacter pylori* natural antigen, more specifically latex microsphere labeled HPC-025 natural antigen.

In some embodiments, the latex microspheres need to be activated prior to labeling, and the latex microspheres are activated by using an EDC solution and an NHS solution in a volume ratio of 1:1 to 1:4 (preferably 1:2).

In some embodiments, in the latex microsphere labeling process, the antigen containing Tritonx-100 (2-(2-[4-(1,1,3,3-Tetramethylbutyl)phenoxy]ethoxy)ethanol) is obtained by adding 0.05%-0.15% Tritonx-100 to the antigen for the detection of the *Helicobacter pylori* antibody, and the antigen containing Tritonx-100 is added to the activated latex microsphere for labeling.

Preferably, in the latex microsphere labeling process, the antigen containing Tritonx-100 is obtained by adding 0.1% (there may be an allowable error in the art, such as an error of 0.01%) of Tritonx-100 to the antigen for the detection of the *Helicobacter pylori* antibody, and then the antigen containing Tritonx-100 is added to the activated latex microspheres for labeling.

In some embodiments, the test strip further comprises a nitrocellulose reaction membrane; a second end of the binding pad is connected to a first end of the nitrocellulose reaction membrane in an overlapping manner; the nitrocellulose reaction membrane comprises a test line; the latex microspheres have an inherent color; one of the criteria for determining the detection results is the aggregation of the latex microsphere-labeled antigen for the detection of the *Helicobacter pylori* antibody after binding to the *Helicobacter pylori* antibody to develop the latex microspheres' inherent color on the test line of the latex microspheres.

Further, the latex microspheres are red, yellow, blue, green or purple, etc.

Further, the latex microsphere has a thickness of 100-500 nm.

Further, the latex microsphere has a thickness of 200 nm.

In some embodiments, the test strip further comprises a nitrocellulose reaction membrane; the second end of the binding pad is connected to the first end of the nitrocellulose reaction membrane in an overlapping manner; the nitrocellulose reaction membrane comprises a test line; the test line is coated with Protein A.

In some embodiments, the kit further comprises a sampling swab and a collection tube; the diluent is dispensed in the collection tube; the collection tube is matched and provided with a collection tube cover; the top of the collection tube cover is provided with a tubular sealing column head; the inner cavity of the tubular sealing column head is in communication with an inner space of the collection tube; the middle section of the tubular sealing column head is recessed to facilitate breaking.

In some embodiments, the kit further comprises a plate cartridge for holding the test strip; the test strip comprises a plate cartridge for holding the test strip; the test strip comprises a base plate and a sample pad, a binding pad, a nitrocellulose reaction membrane, and a water absorbent pad which are successively connected in an overlapping manner at the ends arranged on the base plate; the binding pad binds latex microsphere-labeled antigen for the detection of the *Helicobacter pylori* antibody and latex microsphere-labeled chicken IgY; the nitrocellulose reaction membrane comprises a test line and a control line; the test line is coated with Protein A; the control line is coated with goat anti-chicken IgY; a loading port and an observation window are provided on the cover body of the plate cartridge; the loading port corresponds to the position of the sample pad of the test strip placed in the plate cartridge for loading sample; the observation window corresponds to the position of the test line and the control line of the test strip placed in the plate cartridge for observing the detection result.

In a third aspect, the present invention also provides a method for preparing the kit for the detection of the *Helicobacter pylori* antibody as described above, comprising the following operations: activating the latex microspheres prior to labeling, and activating the latex microspheres by using EDC solution and NHS solution at a volume ratio of (1:1)-(1:4) to obtain the activated latex microspheres.

In some embodiments, the method further comprises the following operations: in the process of labeling latex microspheres, adding 0.05%-0.15% of Tritonx-100 to the antigen for the detection of the *Helicobacter pylori* antibody to obtain the antigen containing Tritonx-100, and then adding the antigen containing Tritonx-100 to the activated latex microspheres for labeling.

In some embodiments, latex microsphere labeling is performed using the following steps:

Step 1, diluting the latex microspheres with MES to obtain a microsphere suspension;

Step 2, activating the latex microspheres using an EDC solution and an NHS solution at a volume ratio of (1:1)-(1:4) to obtain activated latex microspheres;

Step 3, adding 0.05%-0.15% Tritonx-100 to the antigen for the detection of the *Helicobacter pylori* antibody to obtain an antigen containing Tritonx-100;

Step 4, adding the antigen containing Tritonx-100 obtained in step 3 to the activated latex microspheres obtained in step 2 for labeling to obtain the latex microsphere-labeled antigen for detecting the *Helicobacter pylori* antibody; adding a control antigen (such as chicken IgY) to the activated latex microspheres obtained in step 2 to label, so as to obtain a latex microsphere-labeled control antigen.

Step 4 further comprises a post-treatment after the labeling; the post-treatment comprises blocking with BSA, centrifuging the blocked microspheres, and dispersing the centrifuged microspheres with a preservation solution (such as Tris-HCL, sucrose, BSA mixture, preferably 20 mM Tris-HCL+5% sucrose+2% BSA).

Advantageous Effects of the Invention

1. The *Helicobacter pylori* antibody detection kit according to the present invention has no significant requirements for usage scenarios, can be used in medical institutions at all levels or at home, and can be used for household screening of *Helicobacter pylori*.
2. In order to improve the detection rate of Hp, it is undoubtedly more advantageous to prepare the Hp natural antigen by culturing and screening the bacteria strains extracted from patients. The *Helicobacter pylori* HPC-025 of the present invention has superior sensitivity to the natural antigen of Hp international standard strain 11637, the natural antigen of Hp—Ag from the Japanese Institute of Immunology and recombinant antigen of Hp—Ag in the detection of different Hp strains.
3. Latex microspheres are one of the immunochromatography tracers. Compared with traditional colloidal gold, latex microspheres have larger particle sizes and thus have larger specific surface area, so as to improve the binding efficiency of antibody and improve the detection sensitivity of the product. At the same time, compared with fluorescent immune microspheres, latex microsphere has an inherent color, so there is no need to use any other instrument in the interpretation of results, which is more suitable for home-based detection.
4. During latex microsphere activation, when the dose ratio of EDC:NHS is 20 ul: 40 ul, the sensitivity and specificity are optimized. Positive samples can be detected after 100-fold dilution, and the detection result of negative matrix PBS is negative.

5. When Tritonx-100 is pre-added to the HPC-025 natural antigen at a concentration of 0.1%, the detection sensitivity is increased by an order of magnitude compared to that without addition.

6. Protein A is a protein on the surface of *Staphylococcus aureus*, with a molecular weight of about 42 kDa, there are five different domains that can bind to the Fc fragment of IgG, and have a strong specific affinity. Each Protein A molecule can bind to at least two IgG molecules. Therefore, the binding capacity of Protein A to IgG is higher than that of a general anti-IgG antibody. At the same time, Protein A can also bind to IgA, IgM or IgE, and the content of IgA in exudate is significantly higher than that in serum, so the use of Protein A as a capture protein for Hp antibody in oral exudate has higher sensitivity. When Protein A is used as a capture protein, the overall sensitivity is higher than that of IgA+IgG. For weakly positive samples, most of them can be detected as well, and the detection specificity is also better than that of IgA+IgG, which is basically consistent with that of IgG alone.

7. Because of the saliva contained in the oral exudate, the components are relatively complex, and false positives tend to appear in the detection process. Therefore, it is necessary to optimize the components of the used diluent after sampling the exudate to ensure the sensitivity and specificity of product detection. The diluent was PBS+casein+S9+S17, and the coincidence rate of detection results for both 20 positive samples with different antibody titers and 20 negative samples can reach 100%.

In the present invention, an immunochromatography method is used, wherein a test strip comprises a red latex microsphere labeled *Helicobacter pylori* natural antigen and chicken IgY A nitrocellulose membrane test line is coated with Protein A, and a control line is coated with goat anti-chicken IgY When detection is performed, if *Helicobacter pylori* antibody exists in the oral exudate sample (the type of antibody can be IgG, IgM, IgA, etc.), in the chromatographic process, *Helicobacter pylori* antibody is firstly captured by the latex microsphere labeled *Helicobacter pylori* natural antigen to form a red complex. This complex migrates on the nitrocellulose membrane through chromatography, and forms "Protein A-*Helicobacter pylori* antibody-latex microsphere labeled natural antigen *Helicobacter pylori*" complex on the test line to coagulate and develop color, indicating a positive result. If there is no *Helicobacter pylori* antibody in the sample, the complex formed is insufficient for aggregation and development, indicating a negative result.

The conception, the specific structure and the technical effects of the present invention will be further described with reference to the accompanying drawings so that the objects, features and effects of the present invention can be fully understood.

DETAILED DESCRIPTION OF THE INVENTION

In order to make the technical means, creative features, purpose and efficacy of the present invention easy to understand, the present invention is further described in combination with specific illustrations. But the present invention is not limited to the following embodiments.

It should be noted that the structure, proportion, size, etc. shown in the accompanying drawings in this specification are only for the purpose of cooperating with the content disclosed in the specification, for the understanding and reading of those familiar with this technology, and are not intended to limit the conditions under which the present invention can be implemented. Therefore, they do not have any substantive technical meaning. Any modification of the structure, change in the proportion relationship, or adjustment of the size should still fall within the scope of the technical content disclosed in the present invention without affecting the efficacy and objectives that can be achieved by the present invention.

Example 1

(I) Composition of *Helicobacter pylori* Antibody Detection Kit

Figure 1:
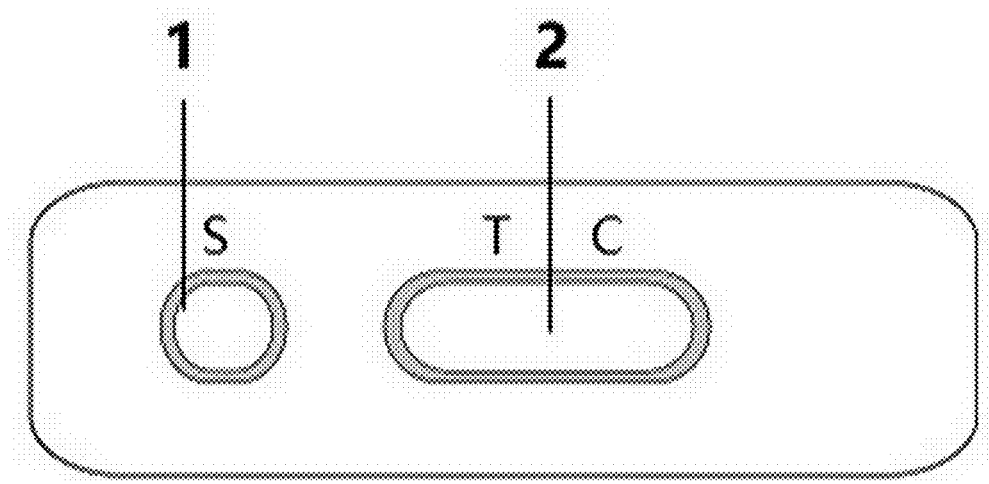
FIG. 1 is a schematic view of a plate cartridge of a *Helicobacter pylori* antibody detection kit according to the present invention.
Figure 2:
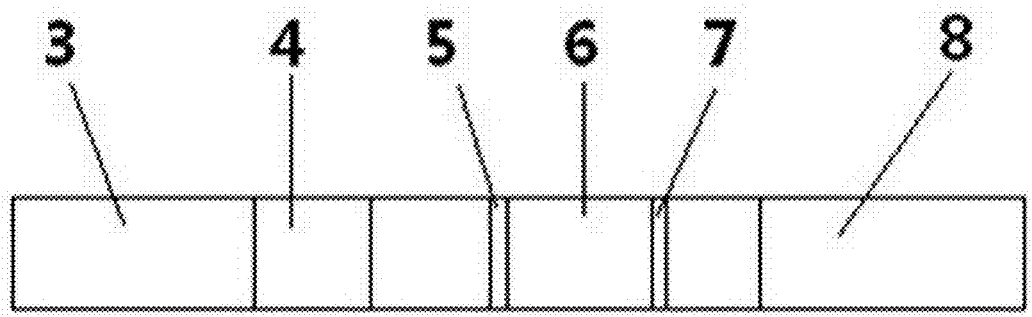
FIG. 2 is a top-view schematic of a test strip of the *Helicobacter pylori* antibody detection kit according to the present invention.

The *Helicobacter pylori* antibody detection kit includes a plate cartridge, a test strip, a sampling swab, and a collection tube. FIGS. 1 and 2 show a plate cartridge and a test strip of the *Helicobacter pylori* antibody detection kit of this example. The plate cartridge is configured to place the test strip. The test strip comprises a base plate and a sample pad 3, a binding pad 4, a nitrocellulose reaction membrane 6 and a water absorbent pad 8 which are arranged on the base plate and are connected in an overlapping manner at the ends thereof. The binding pad 4 is bound with the latex microsphere-labeled *Helicobacter pylori* antibody detection antigen and latex microspheres-labeled chicken IgY The nitrocellulose reaction membrane 6 includes a test line 5 and a control line 7. The test line 5 is coated with Protein A. The control line 7 is coated with goat anti-chicken IgY The loading port 1 and the observation window 2 are provided on the cover body of the plate cartridge. The loading port 1 corresponds to the position of the sample pad 3 of the test strip placed in the plate cartridge, and is configured to load a sample. The letter "S" is marked next to it, representing the sample (Sample). The observation window 2 corresponds to the positions of the test line 5 and the control line 7 of the test strip placed in the plate cartridge, and is configured to observe the detection results. The positions parallel to the test line 5 and the control line 7 are marked with letters "T" and "C", respectively, representing Test and control (Control).

(II) Use of *Helicobacter pylori* Antibody Detection Kit

Figure 3:
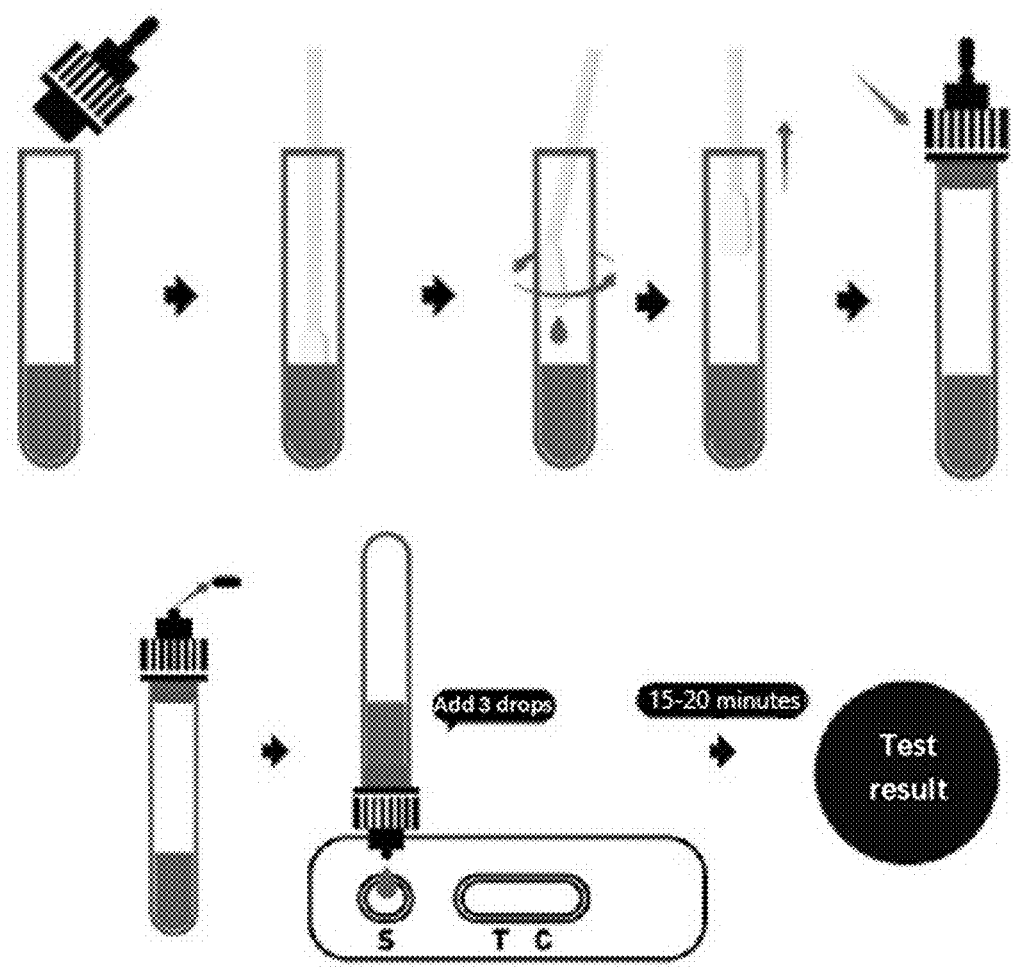
FIG. 3 is a schematic diagram showing the detection process of the *Helicobacter pylori* antibody detection kit according to the present invention.

This kit is configured to detect *Helicobacter pylori* antibody in oral exudate samples. The specific application process (FIG. 3) is as follows:

1. Taking out the sampling swab, wiping the upper gum line using one side of sampling swab (the junction edge of tooth and gum) with moderate force, so as to make 5-6 cycles.
2. In the same manner, wiping the lower gum line with the opposite side of the sampling swab 5-6 times back and forth;
3. Opening the upper cover of collection tube, placing the sampling swab after sampling into the collection tube, repeatedly scraping both sides of the sampling swab with the wall of the collection tube, and fully fusing with the sample processing solution [namely the diluent prepared by mixing 50 mM pH 7.0 PBS with 0.2% casein, 0.2% surfactant Tetronic 1307 (S9), and 0.2% surfactant RHODASURF® ON-870 (S17)] in the collection tube.
4. Before taking out the sampling swab, squeezing the sampling swab on the inner wall of collection tube, so as to ensure that the solution on the sampling swab remains in the collection tube as far as possible, at this time, the solution in the sampling tube is the pre-treated sample solution.
5. Breaking off the tubular sealing column head at the top of the collection tube cover, and then dropping 3 drops of the pretreated sample solution into the loading port of the plate cartridge.
6. Interpreting the results after 15-20 minutes.

Figure 4:
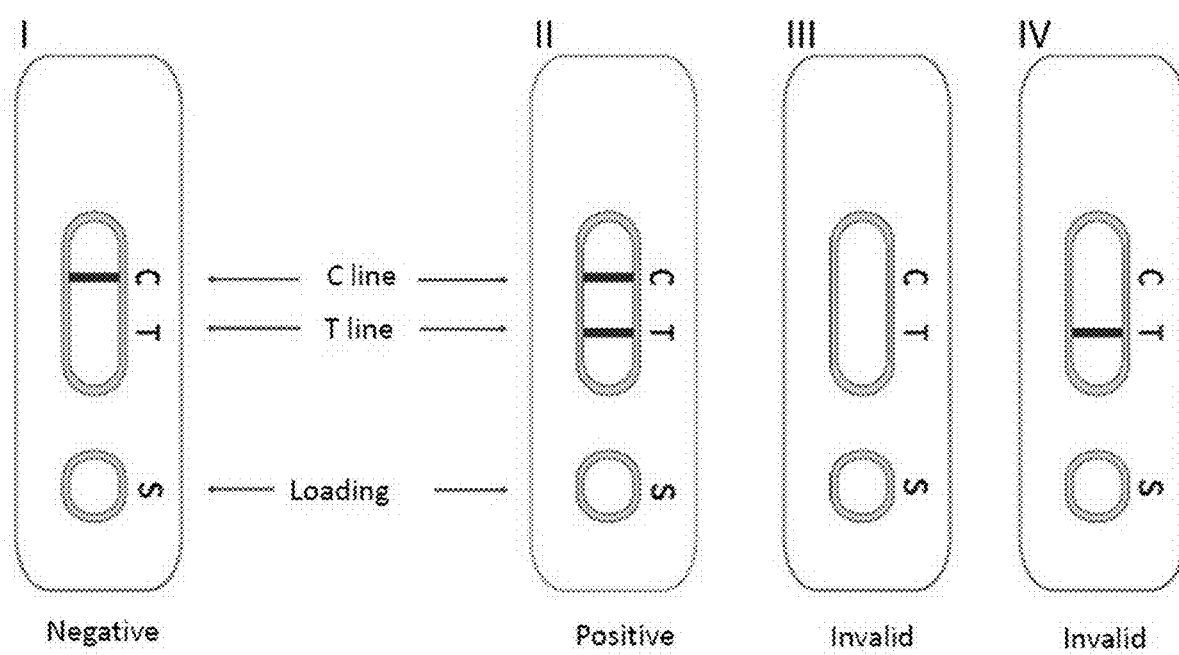
FIG. 4 is a schematic diagram showing the determination criteria of a detection result.

(III) Interpretation of Detection Results of *Helicobacter pylori* Antibody Detection Kit Interpretation of results is performed by observation with the naked eyes. FIG. 4 shows the determination criteria of a detection result, specifically including:
  Positive (II in FIG. 4): a red band appears on each of the test line (T line) and control line (C line).
  Negative (I in FIG. 4): only one red band appears at the location of the control line (C line).
  Invalid (III in FIG. 4 and IV in FIG. 4): there is no red band at the position of test line (T line) and control line (C line), or only one red band at test line (T line) and no band at control line (C line).

(IV) Screening and Preparation Process of Hp Natural Antigen of *Helicobacter pylori* Antibody Detection Kit 1. 40 Hp-positive patients (from different regions such as Shanghai, Guangzhou, Beijing, Heilongjiang, Sichuan, and Xinjiang, with an age distribution of 5-70 years, namely the first group) were screened, gastric mucosal tissues were extracted by gastroscope, and *Helicobacter pylori* culture was performed.
2. The cultures were observed, 28 clones with abnormal morphology and too low growth rate were excluded, and the remaining 12 clones were further verified.
3. The sensitivity and specificity of the above-mentioned 12 clones were verified by taking the serum samples of patients with *Helicobacter pylori* and Hp-negative human serum as matrix components, the clone with the best specificity (basically no growth in Hp-negative human serum) and the highest sensitivity (the best growth in positive serum) was screened and named as *Helicobacter pylori* HPC-025 strain, referred to as HPC-025 strain. The strain HPC-025 was sent to the Chinese Collection of Type Cultures of the depositary institution on Jul. 4, 2022, and the deposit accession number (namely, the deposit number at the depository institution) was CCTCC NO: M20221024.
4. The HPC-025 strain was cultured in an anaerobic environment (5% oxygen, 15% carbon dioxide, 80% nitrogen) on Buchner agar medium containing 7% fetal bovine serum (FBS) for 48 hours. The culture was centrifuged, washed 4 times with pH 7.0 PBS, enriched, and finally resuspended with 5-10 mL of pH 7.0 PBS. The resulting bacteria, an Hp natural antigen, was named HPC-025 natural antigen.

(V) Latex Microsphere Labeling Process of *Helicobacter pylori* Antibody Detection Kit 1. 100 μl of red latex microspheres (particle size 200 nm, purchased from Bioeast Biotech, Hangzhou) was diluted to 1 ml with 50 mM 4-morpholinoethanesulfonic acid (MES) (pH 6.0) to obtain a microsphere suspension.
2. 40 μl of 50 mg/ml N-hydroxysuccinimide (NHS) solution was added into the microsphere suspension to mix well, then 20 μl of 50 mg/ml N-ethyl-N'-(3-dimethylaminopropyl) carbodiimide hydrochloride (EDC) solution was added into the microsphere suspension to mix well. The mixture was reacted at room temperature for 0.5 hours. The reacted microsphere suspension was re-suspended by ultrasonic wave, and then the microsphere suspension was centrifuged. The supernatant was sucked off. The microspheres were added with 1 ml of 50 mM MES (pH 6.0), and dispersed uniformly by ultrasonic wave to complete the activation of latex microspheres.
3. 0.1% Tritonx-100 was added to HPC-025 natural antigen and mixed well.
4. 1 ml of the microsphere suspension activated in step 2 was taken and, ultrasonically dispersed homogeneously, and then labeled respectively, namely, HPC-025 natural antigen prepared in step 3 was added to one of the microsphere suspensions while stirring, and chicken IgY (purchased from Bioeast Biotech, Hangzhou) was added to the other microsphere suspension while stirring. The labeling amount was 0.01 mg to 0.05 mg/ml (the preferred labeling amount was: HPC-025 natural antigen 0.02 mg/ml, and chicken IgY 0.02 mg/mL). After 1-2 min of reaction, each reaction was further sonicated for about 30 seconds and continued for 1 hour.
5. 0.5% bovine serum albumin solution (BSA) was added for blocking for 1 hour.
6. The blocked microspheres were each centrifuged at 12000 r/min for 15 min.
7. 1 ml of preservation solution (20 mM Tris-HCL+5% sucrose+2% BSA) was respectively added to the centrifuged microspheres to disperse the microspheres evenly, so as to obtain labeled latex microspheres of HPC-025 antigen (namely, latex microsphere-labeled antigen for the detection of the *Helicobacter pylori* antibody) and labeled chicken IgY latex microspheres (namely, latex microsphere-labeled chicken IgY) for later use.

(VI) Preparation Process of Test Strip of *Helicobacter pylori* Antibody Detection Kit 1. Binding Pad: 50-150 μl of labeled HPC-025 antigen latex microspheres (preferably used in an amount of 100 μl) and 25-75 μl of labeled chicken IgY latex microspheres (preferably used in an amount of 50 μl) were evenly sprayed on the glass fiber and dried overnight to obtain the binding pad bound with specific latex microspheres.

2. Nitrocellulose Reaction Membrane: the test line was coated with 1-3 mg/mL (preferably used in an amount of 2 mg/mL) of Protein A (purchased from Thermo), and the control line was coated with 1-2 mg/mL (preferably used in an amount a concentration of 1.5 mg/mL) of goat anti-chicken IgY, and dried overnight to obtain a nitrocellulose reaction membrane with a specific test line and control line.

3. A sample pad, a latex microsphere binding pad, a nitrocellulose reaction membrane and a water absorbent pad were adhered to one side of the bottom plate in a sequence overlapping each other, ensuring that one end of the sample pad was pressed against one end of the latex microsphere standard pad by 0.5 to 1 mm, the other end of the latex microsphere pad was pressed against one end of the nitrocellulose membrane by 0.5 to 1 mm, and the other end of the water absorbent pad was pressed against the other end of the nitrocellulose membrane by 0.5 to 1 mm to obtain the test strip.

4. The test strip was placed into the plastic plate cartridge, compacted, and put into an aluminum foil bag for sealing.

(VII) Preparation Process of Diluent of *Helicobacter pylori* Antibody Detection Kit 50 mM of pH 7.0 PBS was prepared, added with 0.2% casein, 0.2% Tetronic 1307 (S9), and 0.2% RHODASURF® ON-870 (S17), and mixed well to obtain the diluent used for oral exudate.

Experimental Example 1 Selection of Hp Antigen

Hp strains are different in different regions and different populations. The sequences used in the preparation of the commonly used commercially available Hp recombinant antigens are from standard libraries, but their sequences have certain limitations, and their ability to detect different types of Hp strains varies greatly. In order to improve the detection rate of Hp, it is undoubtedly more advantageous to prepare the Hp natural antigen by culturing and screening the bacteria strains extracted from different patients.

Considering the high incidence of Hp in China at present, the screening of antigen has a great influence on the subsequent detection. In screening, various factors such as different regions, different populations, and different antibody titers must be considered. Therefore, we selected 40 patients with confirmed positive *Helicobacter pylori* (Hp-positive patients from different regions such as Shanghai, Guangzhou, Beijing, Heilongjiang, Sichuan, and Xinjiang, with an age distribution of 5-70 years, namely the first group. Gastric mucosal tissues were extracted from patients by gastroscopy and gastric culture experiments were performed.

By observing the morphology and growth rate of bacterial strains under a microscope, 28 clones showed abnormal morphology or slow growth rate, while the remaining 12 clones were used for further verification.

Blood samples were collected from the 40 Hp positive patients mentioned above, and antibody titers were tested. Among them, 2 cases were strongly positive, 3 cases were moderately positive, and 5 cases were weakly positive. Simultaneously, 5 normal subject blood samples were selected for specificity verification.

Specificity detection: the negative blood sample was diluted as one of the components of the culture medium for culture, and the growth of colonies was observed. Among 12 clones, 4 clones showed growth, while the remaining 8 clones showed no growth, indicating good specificity. The sensitivity of 8 clones was verified.

Sensitivity test: the positive blood samples were diluted as one of the components of the culture medium for culture, and the growth of colonies was observed, from which the best clone was selected, which grew extensively in 2 strongly positive and 3 moderately positive samples; Among the 5 weakly positive samples, 4 showed normal growth, and there was also a small amount of growth in the remaining 1 weakly positive sample. The other clones showed almost no growth in 1 to 3 positive samples. Accordingly, we preserved this clone as a raw material for subsequent antigen preparation and named HPC-025.

Preparation of Hp Natural Antigen

The HPC-025 strain was cultured in an anaerobic environment (5% oxygen, 15% carbon dioxide, 80% nitrogen) on Buchner agar medium containing 7% fetal bovine serum (FBS) for 48 hours. The colonies were collected, centrifuged, washed 4 times with pH7.0 PBS, enriched, and finally resuspended with 5-10 mL of pH7.0 PBS to obtain an Hp natural antigen, which was named HPC-025 natural antigen.

Verification of antigen detection performance:

colloidal gold was labeled with the above-mentioned HPC-025 natural antigen, and anti-human IgG was coated on a nitrocellulose membrane to prepare a test strip. At the same time, other Hp antigens, Hp international standard strain 11637 natural antigen (purchased from National Collection of Type Cultures (NCTC)), Hp—Ag natural antigen (purchased from Japan Institute of Special Immunology) and Hp—Ag recombinant antigen (purchased from Meridian), were also used to label colloidal gold and to prepare test strips in combination with anti-human IgG. The serum of the above 40 cases of Hp positive patients were detected. The results are shown in Table 1a.

TABLE 1a detection results I for the sensitivity and specificity of different Hp antigens

|  | Coincidence rate (sensitivity) of 40 positive cases | Coincidence rate (specificity) of 5 negative cases |
| --- | --- | --- |
| HPC-025 natural antigen | 39/40 (95%) | 5/5 (100%) |
| Hp international standard strain 11637 natural antigen | 35/40 (87.5%) | 5/5 (100%) |
| Hp-Ag natural antigen | 36/40 (90%) | 5/5 (100%) |
| Hp-Ag recombinant antigen | 33/40 (82.5%) | 5/5 (100%) |

The test strips prepared with different antigens mentioned above were used to make serum tests on another group of the population (52 digestive patients from hospitals in Zhengzhou, Henan and Shanghai, i.e. the second group), and compare the results with carbon breath (Hp diagnostic gold standard) at the same time. See Table 1b for the results.

TABLE 1b

Detection results II for the sensitivity
and specificity of different Hp antigens

|  | Coincidence rate of 25 positive carbon breath cases (sensitivity) | Coincidence rate of 27 negative carbon breath cases (specificity) |
| --- | --- | --- |
| HPC-025 natural antigen | 24/25 (96%) | 26/27 (96.3%) |
| Hp international standard strain 11637 natural antigen | 22/25 (88%) | 25/27 (92.6%) |
| Hp-Ag natural antigen | 22/25 (88%) | 26/27 (96.3%) |
| Hp-Ag recombinant antigen | 21/25 (84%) | 25/27 (92.6%) |

Under the same conditions, the test strip prepared by HPC-025 natural antigen has significant advantages in detection sensitivity and specificity compared with other natural antigens and recombinant antigens in the detection of the second group of the population.

According to the kit of the present invention, through the HPC-025 natural antigen screened from patients, the detection range of the positive samples covers the Hp strains in various populations in various regions in China. Through the comparative test, it can be concluded that the detection sensitivity of the kit of the present invention is higher than that of the Hp natural antigen prepared by international standards and other companies, and is much higher than that of the Hp recombinant antigen. Therefore, the use of HPC-025 natural antigen can ensure that the kit of the present invention has a higher detection sensitivity and avoids the occurrence of missed detection.

Experimental Example 2 the Process of Labeling Hp Antigen with Latex Microspheres Latex microspheres are one of the immunochromatography tracers. Compared with traditional colloidal gold, latex microspheres have larger particle sizes and thus have larger specific surface area, so as to improve the binding efficiency of antibody and improve the detection sensitivity of the product. At the same time, compared with fluorescent immune microspheres, latex microsphere has an inherent color, so there is no need to use any other instrument in the interpretation of results, which is more suitable for home-based detection.

Firstly, the present invention optimized the optimal ratio of 50 mg/ml EDC and 50 mg/ml NHS used in the latex microsphere activation process by screening. The test results were determined by testing a strong positive sample diluted with PBS at different concentrations. The results are shown in Table 2.

TABLE 2

Optimized results of latex microsphere activation process

| | EDC:NHS (ul) | | | | |
| --- | --- | --- | --- | --- | --- |
| | 40:0 | 40:20 | 20:20 | 20:40 | 0:40 |
| PBS | − | − | − | − | − |
| 5-fold dilution | + | +++ | ++++ | ++++ | ++++ |
| 10-fold dilution | + | ++ | +++ | +++ | +++ |
| 50-fold dilution | − | + | + | ++ | + |
| 100-fold dilution | − | − | − | + | − |

In the table, (−) indicates a negative result, (+) indicates a positive result, and the more "+", the stronger the positive color development.

Through screening, if EDC is used alone, the detection sensitivity is very low, while if NHS is used alone, a false positive will be generated, so EDC and NHS must be used in combination. During latex microsphere activation, when the dose ratio of EDC:NHS is 20 ul: 40 ul, the sensitivity and specificity of the product can be optimized. Positive samples can be detected after 100-fold dilution, and the detection result of negative matrix PBS is negative.

In the process of labeling HPC-025 natural antigen with latex microspheres, we unexpectedly found that pre-adding Tritonx-100 into HPC-025 antigen would have a significant effect on the labeling efficiency of lactic acid microspheres. Therefore, we labeled latex microspheres after adding different concentrations of Tritonx-100 into HPC-025 natural antigen, and then detected the samples. The test results were determined by continuing to detect the above strong positive samples with PBS at different dilution ratios. The results are shown in Table 3.

TABLE 3

Effect of Tritonx-100 Addition on Latex Microsphere Labeling Efficiency

| | Tritonx-100 Addition Concentration | | | | |
| --- | --- | --- | --- | --- | --- |
| | 0% | 0.05% | 0.1% | 0.15% | 0.2% |
| PBS | − | − | − | − | − |
| 100-fold dilution | + | ++ | +++ | + | − |
| 400-fold dilution | − | + | ++ | + | − |
| 1000-fold dilution | − | − | + | − | − |
| 2000-fold dilution | − | − | + | − | − |

As can be seen from Table 3, when not adding Tritonx-100, the detection sensitivity could reach 100-fold dilution, while when adding Tritonx-100 at the concentration of 0.1%, the detection sensitivity could reach 1000-fold to 2000-fold dilution, which is an order of magnitude higher than that when not adding Tritonx-100, but the detection sensitivity decreased sharply with the further addition of Tritonx-100. Thus, the addition of 0.1% Tritonx-100 is most preferred.

Latex Microsphere Labeling Process:
1. 100 ul of red latex microspheres (particle size 200 nm, purchased from Bioeast Biotech, Hangzhou) were diluted to 1 mL with 50 mM MES (pH 6.0).
2. 40 μl of 50 mg/ml NHS solution was added into the microsphere suspension to mix well, then 20 μl of 50 mg/ml EDC solution was added into the microsphere suspension to mix well. The mixture was reacted at room temperature for 0.5 hours. The reacted suspension was re-suspended by ultrasonic wave, and then the microsphere suspension was centrifuged. The supernatant was sucked off. The microspheres were added with 1 ml of 50 mM MES (pH 6.0), and dispersed uniformly by ultrasonic wave to complete the activation of microspheres.
3. 0.1% Tritonx-100 was added to HPC-025 natural antigen and mixed well.
4. 1 ml of the activated microsphere suspension was taken and ultrasonically dispersed uniformly. Then, the HPC-025 antigen prepared in step 3 and chicken IgY (purchased from Bioeast Biotech, Hangzhou) was added dropwise with stirring, with a labeling amount of 0.01 mg to 0.05 mg/ml (preferably a labeling amount of HPC-025 natural antigen: 0.02 mg/ml, chicken IgY:

0.02 mg/mL). After 1-2 min of reaction, the reactant was further sonicated for about 30 seconds and continued for 1 hour.
5. 0.5% BSA was added for blocking for 1 hour.
6. The microspheres were each centrifuged at 12000 r/min for 15 min.

1 mL of preservation solution (20 mM Tris-HCL+5% sucrose+2% BSA) was added to the centrifuged microspheres so that the microspheres were evenly dispersed for use.

The prepared latex microspheres were combined with IgG to prepare a test strip, and the colloidal gold method and time-resolved fluorescent microspheres were also used to label HPC-025 antigen and then combined with IgG to prepare a test strip for the detection of samples. The detection sensitivity of several microspheres was compared. The results are shown in Table 4.

TABLE 4

Comparison of detection sensitivity of several microspheres

| | Label microspheres | | | |
|---|---|---|---|---|
| | Colloidal gold | Latex microsphere | Fluorescent microsphere | Fluorescent microspheres + biotin amplification |
| PBS | − | − | − | − |
| 50-fold dilution | + | ++++ | ++++ | ++++ |
| 100-fold dilution | − | +++ | ++ | +++ |
| 400-fold dilution | − | ++ | ++ | ++ |
| 1000-fold dilution | − | + | + | + |
| 2000-fold dilution | − | + | − | + |
| 4000-fold dilution | − | − | − | − |

The detection sensitivity of red latex microspheres labeled by the kit of the present invention after process optimization is much higher than that labeled by colloidal gold and slightly higher than that labeled by common fluorescent microspheres, which is basically consistent with the sensitivity after fluorescent microspheres+biotin amplification. However, compared with the test strip prepared by the fluorescent microsphere+biotin amplification labeling process, the reading of the present invention can be directly read by the naked eyes, without the need for a small device such as a fluorescent pen. The labeling process is simple, without using a biotin amplification system, which is undoubtedly a better choice from the aspects of preparation difficulty and cost reduction.

Experimental Example 3 Selection of coating materials for nitrocellulose membrane test line Unlike blood samples, IgA is also a very important component of Hp antibodies in oral exudate, in addition to IgG. For this reason, we compared four methods of IgG, IgA, IgG+IgA and Protein A in selecting coating materials for the test line, and selected 20 positive exudates with different Hp serum antibody titers (including 5 strongly positive, 8 moderately positive, and 7 weakly positive) and 20 normal subject exudates for comparison. The detection results are shown in Table 5.

TABLE 5

The detection coincidence rate of different test line coating materials for four types of samples

| | Test line coating raw material | | | |
|---|---|---|---|---|
| | IgG | IgA | IgG + IgA | Protein A |
| Coincidence rate of 5 strong positive samples | 4/5 (80%) | 3/5 (60%) | 5/5 (100%) | 5/5 (100%) |
| Coincidence rate of 8 moderate positive samples | 5/8 (62.5%) | 3/8 (37.5%) | 7/8 (87.5%) | 8/8 (100%) |
| coincidence rate of 7 weak positive samples | 3/7 (42.8%) | 2/7 (28.6%) | 4/7 (57.1%) | 6/7 (85.7%) |
| Coincidence rate of 20 normal subjects | 17/20 (85%) | 18/20 (90%) | 16/20 (80%) | 17/20 (85%) |

If IgG or IgA coating is used alone, the specificity of saliva detection is good, but the sensitivity is too low and there are many missed detections. If combined with IgA+IgG coating, the detection sensitivity can be effectively improved, but there are still some missed detections, especially in weakly positive samples, and the specificity will decrease. However, when Protein A is used, the overall sensitivity is higher than that of IgA+IgG. For weakly positive samples, most of them can be detected as well, and the detection specificity is also better than that of IgA+IgG, which is basically consistent with that of IgG alone.

Protein A is a protein on the surface of *Staphylococcus aureus*, with a molecular weight of about 42 kDa. There are five different domains that can bind to the Fc fragment of IgG, and have a strong specific affinity. Each Protein A molecule can bind to at least two IgG molecules. Therefore, the binding capacity of Protein A to IgG is higher than that of a general anti-IgG antibody. At the same time, protein A can also bind to IgA, IgM, or IgE, so using Protein A as a capture protein for Hp antibody in oral exudate has higher sensitivity and specificity.

Experimental Example 4 Optimization of Diluent

The oral exudate contains saliva components, including various enzymes, vitamin hormones and other components, which may cause certain interference in the detection. Therefore, it is necessary to optimize the components of the diluent. We added different inert proteins (BSA and casein) and different surfactants (Tetronic 1307 (S9), RHODA-SURF® ON-870 (S17)) in PBS to detect the 20 cases of positive exudate with different Hp serum antibody titers (including 5 cases of strong positive, 8 cases of medium positive, 7 cases of weak positive) and 20 cases of normal subject exudate samples. See Table 6 for the results.

TABLE 6

Test coincidence rate of diluent of different components for four types of samples

| | Components of diluent | | | | |
|---|---|---|---|---|---|
| | PBS | PBS + BSA | Pbs + Casein | Pbs + Casein + S17 | Pbs + Casein + S9 + S17 |
| Coincidence rate of 5 strong positive samples | 5/5 (100%) | 5/5 (100%) | 5/5 (100%) | 5/5 (100%) | 5/5 (100%) |
| Coincidence rate of 8 moderate positive samples | 8/8 (100%) | 6/8 (75%) | 6/8 (75%) | 8/8 (100%) | 8/8 (100%) |
| Coincidence rate of 7 weak positive samples | 6/7 (85.7%) | 4/7 (57.1%) | 4/7 (57.1%) | 7/7 (100%) | 7/7 (100%) |
| Coincidence rate of 20 normal subjects | 17/20 (85%) | 18/20 (90%) | 20/20 (100%) | 19/20 (95%) | 20/20 (100%) |

In the diluent, the addition of inert protein casein can significantly improve the specificity better than BSA, but the addition of casein alone had a greater impact on the detection sensitivity. On this basis, the addition of surfactant 517 can greatly improve the sensitivity, but it will lead to some false positives in high background. Finally, the combination of S9 and S17 can improve the specificity while ensuring the sensitivity is not affected. Therefore, the diluent components PBS+casein+S9+S17 were finally selected. The coincidence rate of detection results of 20 positive samples and 20 negative samples with different antibody titers reached 100%.

Test Example 5 Comparison of Oral Exudate Test and Urine Test

In order to verify the reliability of the test results of oral exudate, we collected the oral exudate (referred to as exudate in Table 7-10) and urine samples every morning, noon, and night for three consecutive days with 4 patient samples (including 1 case of Hp serum strong, medium, and weak antibody positive titer, and 1 case of normal human sample), and detected them simultaneously. See Table 7-10 for the results

TABLE 7

Test results of sample 1 (strong positive sample)

| | Day 1 | | Day 2 | | Day 3 | |
|---|---|---|---|---|---|---|
| | Exudate | Urine | Exudate | Urine | Exudate | Urine |
| Morning | +++ | +++ | +++ | +++ | +++ | +++ |
| Noon | +++ | ++ | +++ | +++ | +++ | +++ |
| Night | +++ | +++ | +++ | ++ | +++ | +++ |

TABLE 8

Test results of sample 2 (medium positive sample)

| | Day 1 | | Day 2 | | Day 3 | |
|---|---|---|---|---|---|---|
| | Exudate | Urine | Exudate | Urine | Exudate | Urine |
| Morning | ++ | ++ | ++ | ++ | ++ | ++ |
| Noon | ++ | ++ | ++ | + | ++ | ++ |
| Night | ++ | ++ | ++ | ++ | ++ | − |

TABLE 9

Test results of sample 3 (weakly positive sample)

| | Day 1 | | Day 2 | | Day 3 | |
|---|---|---|---|---|---|---|
| | Exudate | Urine | Exudate | Urine | Exudate | Urine |
| Morning | + | + | + | − | + | + |
| Noon | + | + | + | − | + | + |
| Night | + | − | + | + | + | − |

TABLE 10

Test results of sample 4 (normal subject negative sample)

| | Day 1 | | Day 2 | | Day 3 | |
|---|---|---|---|---|---|---|
| | Exudate | Urine | Exudate | Urine | Exudate | Urine |
| Morning | − | − | − | − | − | − |
| Noon | − | − | − | − | − | − |
| Night | − | − | − | − | − | − |

The results showed that the detection results of oral exudate for Hp antibody had very good repeatability, and the detection results of positive samples with different antibody titers were consistent. As for the urine test, the overall results were also consistent, but for moderate positives, especially weak positives, fluctuations were likely to lead to missed detections, mainly due to the fact that urine is a product of the metabolic pathway, which is greatly affected by diet, physical condition, exercise, and the amount of water consumed. Therefore, urine tests often require multiple monitoring to obtain more accurate results. In comparison, the consistency rate of oral exudate test results is high, and the test results are more reliable.

Experimental Example 6 Comparison of Performance of Test Kits with Different Methodologies The prior art (such as CN111983229 A) relates to a reagent strip and a detection method for detecting Hp antibody in serum using a colloidal gold test strip prepared from natural Hp antigen, and compared with these prior art documents, the most significant advantage of the present invention is using completely non-invasive oral mucosa exudate as a sample for detection, and achieving a relatively high detection accuracy. The following is further illustrated by specific test data to facilitate a better understanding of the present invention but is not intended to limit the scope of the invention.

The current gold standard for the detection of *Helicobacter pylori* is the carbon breath test. In this trial, a preliminary clinical test was conducted on a third group of patients (101 digestive patients from hospitals all over the country, including Shanghai, Zhengzhou, Henan, Wuwei, Gansu, Wuhan, Hubei, and Guangzhou, etc.). Blind testing was conducted on the patient by synchronously collecting oral mucosal exudate and blood. The oral mucosa exudate was tested with the reagent of the present invention. The blood test was conducted with Shanghai Chemtrue *Helicobacter pylori* antibody detection reagent product with excellent overall evaluation on the market and approved by CFDA for registration. Meanwhile, we also tested the oral mucosal exudate samples with Shanghai Chemtrue *Helicobacter pylori* antibody detection reagent product. All test results were compared using the results of the carbon breath test as a standard. Of the 101 samples, 28 were Hp-positive cases and 73 were Hp-negative cases, as confirmed by the results of the carbon breath test. The comparative test results are shown in Table 11.

TABLE 11

Comparison results with Shanghai Chemtrue

| Test sample type | The reagent of the present invention | | Shanghai Chemtrue |
| --- | --- | --- | --- |
| | Oral exudate | Blood | Oral exudate |
| 28 Carbon breath positive cases | 27/28 (96.4%) | 26/28 (92.9%) | 10/28 (35.7%) |
| 73 Carbon breath negative cases | 71/73 (97.3%) | 71/73 (97.3%) | 73/73 (100%) |

The results showed that the Hp antibody in the oral exudate was detected by the present invention, and the Hp antibody in the homologous blood sample was detected by the Shanghai Chemtrue reagent, both of which had very high consistency with the gold standard carbon exhalation results, demonstrating that both reagents had very good detection accuracy. However, if the oral exudate sample is detected with the product of Shanghai Chemtrue, the detection rate is only 35.7%, which is far lower than the detection sensitivity of blood. This is because the Hp antibody content in the oral exudate is only about 5% to 10% of the antibody content in the blood, so the sensitivity requirement of the product for oral exudate detection is much higher than that of the same type of blood detection reagent. Whereas the prior art (e.g., CN111983229A) detects blood samples, the reagent of the present invention detects salivary exudate, and in terms of product development difficulty, the present invention is far superior to the prior art.

Preferred specific embodiments of the present invention are described in detail above. It will be appreciated by persons skilled in the art that numerous modifications and variations can be made to the present invention without departing from the scope of the invention. Therefore, any technical solution that can be obtained by logical analysis, reasoning or limited experimentation by a person skilled in the art on the basis of the prior art in accordance with the concept of the present invention shall be within the scope of determined by the claims.

What is claimed is:

1. A kit for a detection of a *Helicobacter pylori* antibody in an oral exudate, comprising
    a latex microsphere-labeled antigen, wherein the antigen is strain *Helicobacter pylori* HpC-025, with a deposit registration number of CCTCC No: M20221024, deposited at China Center for Type Culture Collection in Wuhan University on Jul. 4, 2022; and
    a diluent for diluting the oral exudate, wherein the diluent contains phosphate buffered saline (PBS), casein, and surfactants, wherein the surfactants are ethylenediamine tetrakis(ethoxylate-block-propoxylate) tetrol, and ethoxylated oleyl alcohol.

2. The kit for the detection of the *Helicobacter pylori* antibody according to claim 1, further comprising a test strip; wherein the test strip comprises a binding pad; the binding pad binds the latex microsphere-labeled antigen for the detection of the *Helicobacter pylori* antibody according to claim 1.

3. The kit for the detection of the *Helicobacter pylori* antibody according to claim 2, wherein the test strip further comprises a nitrocellulose reaction membrane; a second end of the binding pad is connected to a first end of the nitrocellulose reaction membrane in an overlapping manner; the nitrocellulose reaction membrane comprises a test line; the latex microspheres has an inherent color; a criteria for determining detection results is an aggregation of the latex microsphere-labeled antigen for the detection of the *Helicobacter pylori* antibody after binding to the *Helicobacter pylori* antibody to develop the inherent color of latex microspheres on the test line.

4. The kit for the detection of the *Helicobacter pylori* antibody according to claim 2, wherein the test strip further comprises a nitrocellulose reaction membrane; a second end of the binding pad is connected to a first end of the nitrocellulose reaction membrane in an overlapping manner; the nitrocellulose reaction membrane comprises a test line; the test line is coated with Protein A.

5. The kit for the detection of the *Helicobacter pylori* antibody according to claim 2, further comprising a sampling swab and a collection tube; the diluent is dispensed in the collection tube; the collection tube is matched and provided with a collection tube cover; a top of the collection tube cover is provided with a tubular sealing column head; an inner cavity of the tubular sealing column head is in communication with an inner space of the collection tube; a middle section of the tubular sealing column head is recessed to facilitate breaking.

6. The kit for the detection of the *Helicobacter pylori* antibody according to claim 2, further comprising a plate cartridge for holding the test strip; the test strip comprises a base plate, a sample pad, the binding pad, a nitrocellulose reaction membrane, and a water absorbent pad, wherein the sample pad, the binding pad, the nitrocellulose reaction membrane, and the water absorbent pad are successively connected in an overlapping manner at ends arranged on the base plate; the binding pad binds the latex microsphere-labeled antigen for the detection of the *Helicobacter pylori* antibody and latex microsphere-labeled chicken IgY; the nitrocellulose reaction membrane comprises a test line and a control line; the test line is coated with Protein A; the control line is coated with goat anti-chicken IgY; a loading port and an observation window are provided on a cover body of the plate cartridge; the loading port corresponds to a position of the sample pad of the test strip placed in the plate cartridge for loading a sample; the observation window corresponds to a position of the test line and the control line of the test strip placed in the plate cartridge for observing a detection result.

7. A method for preparing the kit for the detection of the *Helicobacter pylori* antibody according to claim 2, comprising steps of: activating latex microspheres prior to labeling, and activating the latex microspheres by using a carbodiimide hydrochloride (EDC) solution and an N-hydroxysuccinimide (NHS) solution at a volume ratio of (1:1)-(1:4) to obtain activated latex microspheres.

8. The method for preparing the kit for the detection of the *Helicobacter pylori* antibody according to claim 7, further comprising the following operations: in a process of labeling the latex microspheres, adding 0.05%-0.15% of 2-(2-[4-(1,1,3,3-Tetramethylbutyl)phenoxy]ethoxy)ethanol to the antigen to obtain an antigen containing the 2-(2-[4-(1,1,3,3-Tetramethylbutyl)phenoxy]ethoxy)ethanol, and then adding the antigen containing the 2-(2-[4-(1,1,3,3-Tetramethylbutyl)phenoxy]ethoxy)ethanol to the activated latex microspheres for labeling.

\* \* \* \* \*